Figure 1:
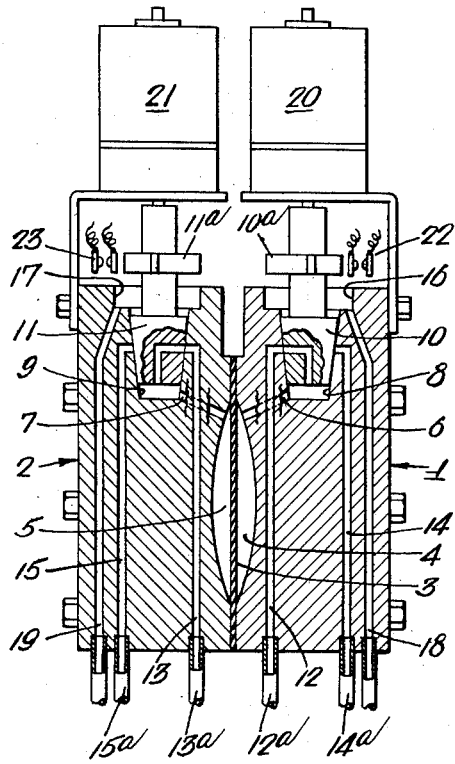

Feb. 18, 1964    H. GALSTER    3,121,614
APPARATUS FOR AUTOMATIC TITRATION
Filed April 18, 1960

Inventor
Helmuth Galster
by Howson & Howson
Attys.

United States Patent Office 3,121,614
Patented Feb. 18, 1964

3,121,614
APPARATUS FOR AUTOMATIC TITRATION
Helmuth Galster, Hamburg-Bramfeld, Germany, assignor, by mesne assignments, to Bran & Lubbe Wasseraufbereitung Maschinen- und Apparatebau, Hamburg, Germany
Filed Apr. 18, 1960, Ser. No. 22,801
Claims priority, application Germany Apr. 24, 1959
2 Claims. (Cl. 23—253)

Titration is the most frequently used method for controlling and checking chemical reactions, and particularly for determining the amounts of participants in the reaction in a reaction solution. In the prior art automatic techniques have been developed for all phases of the process except actual titration of the reagent or titration fluid. The present invention supplies an automatic titration technique which makes it possible for the control and checking functions necessary to a titration process to be preformed automatically and continuously.

In titration, there are the following sequential operations:

(1) Measuring out a certain volume of a specimen fluid that is to be investigated, and possibly measuring out at the same time certain auxiliary reagents;

(2) The introduction of the metered amount, or amounts, of fluid into a reaction vessel;

(3) The addition of an exactly measurable volume, variable to suit the case under consideration, of a titration fluid or reagent;

(4) Determining the endpoint of the titration;

(5) Registration of the amount of reagent used, and determining the result of the investigation.

Heretofore an apparatus for carrying out all these operations automatically has not been known.

The present invention is directed to an apparatus for automatic titration, consisting of a metering pump for measuring out the fluid that is to be titrated, a reaction vessel, a measuring buret, and, on occasion, an indicating contrivance. Characteristically, a metering pump consisting of two chambers and a movable diaphragm disposed between them serves as the measuring buret. One of these pump chambers is used for pumping the titrating fluid, while the other chamber is filled with an inert fluid, such as, for example, oil. An essential thing is also that the titrating pump does not pump the titration reagent directly, but pumps, as an auxiliary fluid, a hydraulic oil. That oil is separated from the actual reagent by a diaphragm. The oil protects the mechanical parts of the pump from corrosion, and at the same time provides for its lubrication. The pump chamber that takes the titrating reagent is connected, by way of a two-way valve, alternately with the outflow of the supply vessel for the reagent and with the inflow of the reaction vessel.

In a preferred embodiment the pump chamber to take the inert fluid is advantageously connected to an upright cylinder containing a piston and situated above the chamber. The piston rod is able to move up and down in the cylinder with the piston and preferably has through it a lengthwise bore provided with appropriate valve means so that it can be closed at its upper end. The valve means is of a type which makes it possible to remove air from the piston space through the piston rod bore without loss of fluid pressure in the cylinder. Other types of piston mechanism may alternatively be employed. However, in accordance with the invention, it has proved particularly advantageous to move the piston rod up and down, through the intermediary medium of a worm drive from a synchronous motor. This synchronous motor may be electrically coupled to a second similar motor, which in its turn operates an indicating device, if required, by pick-up means associated with a remote control or transmitter.

The type of metering pump preferred here is a diaphragm pump that consists of two similar mirror-image halves. The two chambers of the diaphragm pump are each connected, by way of a two-way valve, with an inflow and outflow conduit for the inert and the titration fluids respectively.

Determination of the endpoint of the titration can be done in any conventional way, for example, it can be done by electro-mechanical sensing devices. It can also be done optically, for example, by the aid of a photocell that determines the position of the piston at the end of the titration.

Figure 2:
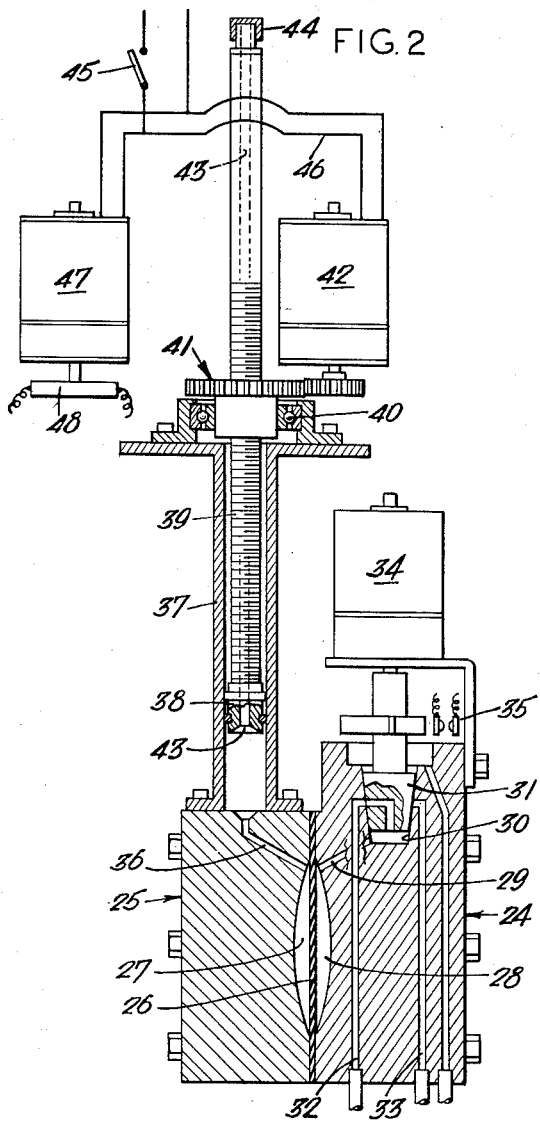

The accompanying drawing shows two embodiments of the invention wherein:

FIG. 1 shows a diaphragm pump arrangement for metering the liquid to be titrated; and FIG. 2 shows the preferred piston arrangement for controlling the inert actuating medium in a titrating liquid dispensing apparatus according to the invention.

The diaphragm pump which serves for measuring out the titration fluid consists of the two similar mirror-image housing blocks 1 and 2, between which is clamped the diaphragm 3. To the left and right of the diaphragm the pump housing is similarly but oppositely hollowed out to form chambers 4 and 5. Chambers 4 and 5 are connected respectively through the holes 6 and 7 bored in housing blocks 1 and 2 to the bottom of sockets 8 and 9 which receive valve plugs 10 and 11. Both valve plugs have a bore extending through the plug from its bottom to a point on its side surface. The hole in the side surface of the plug can be positioned by rotation to coincide alternatively with each of the two openings in the lateral surface of the socket which is taped to snugly receive the plug and provide a valve seat. Corresponding openings through the valve seats provide one end of bored conduits 12 and 13. The outer openings in the plug seat provide one end of bored conduits 14 and 15. Each of these bores advantageously has its outlet at the underside of the pump block. Annular recesses 16 or 17, above valve sockets 8 and 9 serve to collect any leakage fluid from the valves and drain it through bores 18 or 19 also through blocks 1 and 2.

Conduit 12 may be connected to the fluid supply (see FIG. 2) which is preferably positioned above chamber 4 to provide a pressure head. Conduit 14 is then connected to the reaction vessel in a region which is open to atmosphere so that no back pressure is applied to the chamber 4. Similarly, conduit 15 may be connected to fluid supply of inert fluid and conduit 13 connected to a sump for that fluid. In operation, as will be described, the valves are arranged to be moved in synchronism so that as one chamber fills the other empties.

The fluid that is to be investigated is, for example, conveyed, by way of the conduit 12 and bored hole 6, to the chamber 4 of the diaphragm pump, whereby the flexible diaphragm is pressed by the pressure of that fluid against the left side of the chamber, thereby increasing the volume of chamber 4 and collapsing chamber 5 until the fluid occupies the full volume of the pump cavity 4—5. As this occurs air contained in the chamber 5 escapes by way of the hole 7 through the channel 13. Now the valves 10 and 11 are reversed, preferably by means of synchronous motors 20 and 21. The fluid occupying the enlarged chamber 4 is then no longer under pressure and is forced through the conduit 14 into the titration reaction vessel as oil or other inert fluid flows under pump pressure through the conduit 15 into the chamber 5 of the diaphragm pump. Now chamber 5 expands as chamber 4 collapses until the diaphragm 3 is against the concave wall of chamber 4. In this way a precisely measured amount of fluid is forced into the reaction chamber each cycle of operation, and the process may be carried on indefinitely. Since the amount added each cycle is a precise volume, total volume measurement is then calculated by totaling the number of cycles of operation.

Instead of the two synchronous motors it is also possible to use a single motor having a suitable coupling transmission. Associated with cams 10a or 11a on the two valve plugs 10 and 11 or their couplings are electric reversing switches 22 and 23. Switches 22 and 23 are preferably parts of switching circuits which either cause reversal of direction of the motor or shifts in gearing to accomplish the same effect. Actually no reversal is necessary and merely pauses in rotation to permit filling and emptying of the chambers 4 and 5 at the proper time are required. The necessary timing circuits and/or reversing circuits have not been illustrated because they may be of any number of conventional types.

Considerable reliability of operation of the apparatus is obtained through use of valves of the form shown in the drawing. Each of these valves has only one bore that leads from the bottom to the side face of the plug. Their seats have only two holes in each seat. A simple rotary motion about a vertical axis takes place with the plug snugly in its seat. This valve construction also serves as a safety valve, in that should the pressure become too great, the plug relieves pressure as it simply becomes displaced upward. Moreover, the construction of the metering pump described here out of two geometrically similar body halves offers considerable advantages from the production point of view.

A titrating liquid dispensing apparatus in accordance with the invention is illustrated by FIG. 2 of the drawing. It consists of two blocks 24 and 25, between which, as in the case of the metering pump according to FIG. 1, there is clamped a resilient, deformable diaphragm 26. As in the metering pump of FIG. 1, the two pump blocks are hollowed out at their sides opposite the diaphragm to provide two chambers 27, 28 that are separated by the diaphragm 26. As in the first case, as chamber 27 fills, chamber 28 must collapse, and vice versa. The chamber 27 is arranged to be filled with an inert fluid, oil for example, while the chamber 28 is arranged to be filled with the titration fluid. The chamber 28 is connected through the bore 29 to the space 30 situated below the valve plug 31. Depending upon the position of the valve plug, the chamber 30 can be connected to the conduit 32 or to the conduit 33. The conduit 32 is connected to the supply vessel (not shown) for the titration solution; while the conduit 33 is connected to the titration reaction vessel. Reversal of the valve plug 31 is done automatically by the aid of the synchronous motor 34. Only the electrical reversing switch from the appropriate conventional circuit is shown at 35 in the drawing.

The chamber 27 is connected through the bore 36 to the elongated cylinder 37, inside which the piston 38 moves up and down. The piston 38 is mounted on the lower end of the piston rod 39, that is piloted in the bearing 40 and has a worm drive 41 from the motor 42. In order to make it possible to evacuate air from the oil-pressure chamber 27, the piston rod 39 has a longitudinal channel 43, that permits the bleeding off of gas while at the same time preventing leakage of fluid at 44 from the top of the rod.

For the purpose of titrating, the piston 38 is driven upward by the motor 42 until the diaphragm 28 bears completely against its left side. The chamber 28 meantime completely fills with titrating fluid through the conduit 32. By the aid of the motor 34 the valve 31 is now reversed, so that the chamber 28 is connected through the conduit 33 with the titration reaction vessel. The synchronous motor 42 is started and by means of the worm drive 41 moves the piston rod 39, together with the piston 38, slowly downward. Because of this, the titrating fluid is slowly forced out of the chamber 28 and into the titration reaction vessel. When the titration endpoint is reached, the motor 42 is stopped by the aid of the switch 45.

A number of advantages are obtained by the indirect pumping of the titration fluid. The piston and cylinder of the measuring buret with this arrangement do not come at all into contact with the different titrating fluids, which usually have an intense corrosive action. This not only means the prevention of any corrosion, but it also makes it possible to use, especially for the moving parts of the apparatus, ordinary materials such as brass that are not corrosion-resistant and that are easy and cheap to machine. The inspection or maintenance, and lubrication, of these parts presents no problem, so that reliability of operation of the apparatus is assured. Only the parts of the apparatus subject to corrosion, conversely need be made of corrosion resistant materials.

Establishment of the titration endpoint can be done by means that are known per se. For example a pick-up of a variable electrical resistance whose resistance varies as a function of the height position of the piston rod 39, or means that records or counts when the end of the piston rod is in uppermost position by means of a photocell may be used.

The present system also eliminates measuring problems. Measurement of the reagent solution used through counting the drops is unnecessary. Such arrangements have had the drawback that they have to be disposed in the vicinity of the titration apparatus and are thus within the range of action of any chemicals and vapors that are present. Electrical connections, and also any photoelectric devices, may suffer from these effects, so that their indications readily become unreliable.

In addition, such arrangements require the greatest precision in the return of the titrating apparatus to its initial of zero position.

The systems of the present invention also lend themselves to remote indication or telemetering techniques. In accordance with the invention, a synchronous similar signal can be produced at the titration pump and at a point remote therefrom. The synchronous motor 42, which serves to drive the piston buret, for example, may be coupled over conductors 46 with a second similar synchronous motor 47, so that it rotates in synchronism with that motor. Synchronous motor 47 can be situated at any desired distance from the drive motor 42. If desired, motor 47 may by means of an electrical teletransmitter 48 actuate any desired indicating or recording apparatus, from which it is possible to read off directly the titration endpoint. Also because a definite advance motion of the piston rod corresponds to a fixed number of alternating current pulses, it is also a simple matter to employ counting mechanisms and similar recording devices to record the amount of reagent used.

Certain preferred embodiments of the invention have been shown and described. Other embodiments or modifications within the invention are possible within the scope of the claims.

I claim:

1. A titrating fluid dispensing apparatus, comprising, in combination, diaphragm pump means comprising a housing provided with an internal cavity, a flexible diaphragm extending across said cavity so as to divide the latter into a first and second pump chamber; first duct means communicating with said first pump chamber for introducing into the latter and for delivering from the same titrating liquid; second duct means communicating with said second pump chamber for introducing into the latter and for releasing therefrom a pressure liquid; first control means associated with said first duct means for permitting, when in one position, the flow of said titrating liquid therethrough toward said first pump chamber, and, in a second position, out of said first pump chamber; second control means associated with said second duct means for controlling the flow of said pressure liquid therethrough and including burette means comprising a tubular member of predetermined internal cross-sectional area and plunger means movable axially within said tubular member for causing flow of said pressure liquid through said second duct means in either direction accordingly; actuator means for alternatively placing said first control means in said one and a second position, respectively; and drive means for moving said plunger means axially along said tubular member, so that with said first control means in said one position movement of said plunger means in one direction removes pressure liquid from said second pump chamber and causes said titrating liquid to enter said first pump chamber, while with said first control means in said second position movement of said plunger means in opposite direction forces said pressure liquid into said second pump chamber and causes a corresponding amount of said titrating liquid to be delivered from said first pump chamber.

2. A titrating fluid dispensing apparatus, comprising, in combination, diaphragm pump means comprising a housing provided with an internal cavity, a flexible diaphragm extending across said cavity so as to divide the latter into a first and a second pump chamber; first duct means communicating with said first pump chamber for introducing into the latter and for delivering from the same titrating liquid; second duct means communicating with said second pump chamber for introducing into the latter and for releasing therefrom a pressure liquid; first control means associated with said first duct means for permitting, when in one position, the flow of said titrating liquid therethrough toward said first pump chamber, and, in a second position, out of said first pump chamber; second control means associated with said second duct means for controlling the flow of said pressure liquid therethrough and including burette means comprising a tubular member of predetermined internal cross-sectional area and plunger means movable axially within said tubular member for causing flow of said pressure liquid through said second duct means in either direction accordingly; actuator means for alternatively placing said first control means in said one and a second position, respectively; and drive means for moving said plunger means axially along said tubular member, said drive means including electro-motor means and transmissions means for converting a predetermined rotary speed of said electromotor means into a comparatively slow axial movement of said plunger means, and remote indication means including synchronous motor means connected with said electromotor means for synchronous operation, and indicator means operated by said synchronous motor means for indicating the axial movement of said plunger means and thereby the amount of said titrating liquid delivered during a given time of movement of said plunger means, so that with said first control means in said one position movement of said plunger means in one direction removes pressure liquid from said second pump chamber and causes said titrating liquid to enter said first pump chamber, while with said first control means in said second position movement of said plunger means in opposite direction forces said pressure liquid into said second pump chamber and causes a corresponding amount of said titrating liquid to be delivered from said first pump chamber.

References Cited in the file of this patent

UNITED STATES PATENTS

| 2,950,396 | Schneider | Aug. 23, 1960 |
| 2,992,077 | Schneider et al. | July 11, 1961 |
| 3,019,091 | Schneider | Jan. 30, 1962 |